A. H. Hook,
Refining Oils.
No. 89,998. Patented May 11, 1869.
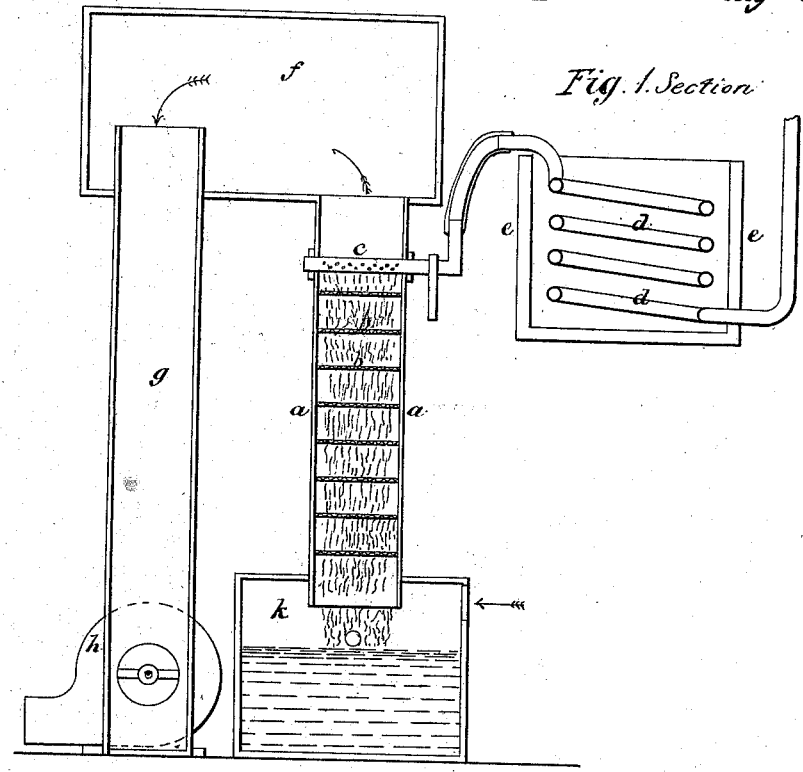
Fig. 1. Section
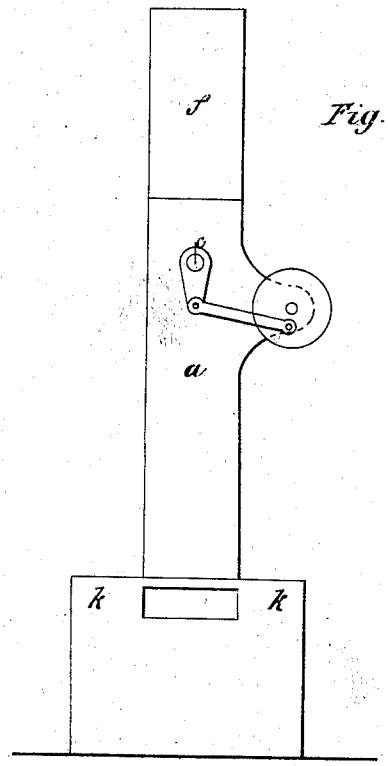
Fig. 2.
Witnesses,
Alfred Suttman
William A. Collins
Inventor.
Albert H. Hook

United States Patent Office.

ALBERT H. HOOK, OF NEW YORK, N. Y., ASSIGNOR TO SMITH GARDNER.

Letters Patent No. 89,998, dated May 11, 1869.

IMPROVED APPARATUS FOR FREEING PETROLEUM AND OTHER LIQUIDS FROM GAS

The Schedule referred to in these Letters Patent and making part of the same.

Be it known that I, ALBERT H. HOOK, of the city, county, and State of New York, have invented a new and useful Apparatus for Separating and Removing Inflammable and Explosive Gases from Petroleum, Kerosene, Gasoline, and other liquids of similar nature and composition, and also for separating and removing fusel-oil and deleterious gases from alcohol or alcoholic liquids; and I do hereby declare that the following is a full and exact description of the construction and operation thereof, reference being had to the annexed drawing, making part of the specification.

Figure 1 is a longitudinal vertical section, and

Figure 2 a side view of a dripping-chamber, $a$ $a$, about ten feet in height, a transverse section of which is about twelve by twelve inches.

A series of diaphragms, or strainers, $b$ $b$ $b$ $b$, made of fine wire gauze, or finely-perforated metallic plates, is fitted into this chamber in a horizontal position, one above another, and about four inches apart.

A pipe, $c$, about one inch in diameter, which I call a feed-pipe, is placed horizontally across the centre of the upper diaphragm, and about four inches above it, one end of which is connected with the tank from which the liquid is drawn in to the dripping-chamber, and the other closed, or stopped up.

The liquid is discharged upon the upper diaphragm through perforations made in the under side of the feed-pipe $c$, and to effect an equal distribution of it over the surface of the diaphragm, a slight rolling or oscillating motion may be given to the pipe by any convenient mechanical device.

The kerosene to be treated is passed from the tank or cistern which contains it to the dripping-chamber, through the coil $d$ $d$, in the tank $e$ $e$, where it is heated up to any required degree, to facilitate the separation of the deleterious matter from it.

I find 120° Fahrenheit to be about the right temperature for it.

The dripping-chamber extends up above the diaphragms, and enters the bottom of a large, tight chamber, $f$, which may be about four feet deep, three feet wide, and six feet long.

A vertical flue, $g$, also enters the bottom of this chamber $f$, and extends up into it about two feet.

A fan-blower, $h$, is placed in the lower end of this flue, and enclosed in it in such a manner that it must draw its supply of air up through the dripping-chamber $a$ and the large chamber $f$.

The apparatus being thus constructed and arranged and the blower in operation, the liquid is then let into the dripping-chamber, and sprinkled over the surface of the upper diaphragm, or strainer, in the manner described, and in its downward passage through the chamber it is exposed to a strong upward current of air, produced by the operation of the blower, and indicated by arrows in the drawings.

On passing through the series of diaphragms, or strainers, the liquid is blown into fine spray, and when in that comminuted state, the inflammable gas, &c., is separated from it and carried off by the current of air, while the purified liquor continues its downward course until it reaches the tank $k$, at the bottom of the dripping-chamber.

Care should be taken that the current of air is not so strong as to carry the liquid up with it, but should it so happen, by carelessness or otherwise, that any part of it should be thus carried up, the strength of the current of air, the moment it reaches the large chamber $f$, will be so reduced that the liquid will fall and return to the dripping-chamber.

I do not confine myself to any particular number of diaphragms in the series, but I am using twelve with perfect success. Nor do I confine myself to the method I have herein described in impelling a current of air through the dripping-chamber, as it may be done successfully by other well-known means, but I prefer the one I have adopted.

The apparatus may be made of wood, or any other suitable material, and of any size that may be required.

What I claim as my invention, and desire to secure by Letters Patent, is—

1. The dripping-chamber.
2. Passing a current of air up through the chamber while the liquid is dripping down it.
3. Checking, or reducing the force of the current of air as soon as it has passed through the dripping-chamber, by means of the large chamber $f$, and thus preventing it from carrying the liquid away with it.
4. The construction, combination, and arrangement of the dripping-chamber, the large chamber $f$, and the flue $g$, substantially in the manner described, and for the purposes specified.

ALBERT H. HOOK.

Witnesses:
ALFRED LATTMAN,
WILLIAM A. COLLINS.